Patented Sept. 5, 1950

2,520,954

UNITED STATES PATENT OFFICE 2,520,954

SHORTENING

Gerald C. North, Alvin J. Alton, and William C. Brown, Chicago, Ill., assignors to Beatrice Creamery Company, Chicago, Ill., a corporation of Delaware No Drawing. Application January 14, 1946, Serial No. 641,171

1 Claim. (Cl. 99—123)

This invention relates to powdered shortenings used in the manufacture of baked goods such as bread, rolls, cakes, pastries, and similar products. Such granular shortenings comprise a fat core and a hull which forms a protective casing and is generally composed principally of milk solids not fat.

We have discovered that a satisfactory powdered shortening devoid of milk solids not fat, or having an appreciably reduced amount of milk solids not fat in the hull, can be satisfactorily prepared by including egg yolk in the composition from which the shortening is made, and by using instead of the milk solids not fat, carbohydrates such as flour, sugar, corn syrup solids, gelatinized flour, starches, or a protein containing substance such as soya bean or peanut flour. Mixtures of the carbohydrates or mixtures of the proteinous materials may be used or mixtures of the carbohydrate and proteinous materials may be employed. The egg yolk, carbohydrate and proteinous materials form the casing or hull for protecting the fat granules against caking.

The following examples illustrate granular products which have been found satisfactory, and the parts are based on the dry weight of the final granular shortening:

Example 1

Total fat 73 parts:
    53 parts by weight shortening fat
    30 parts by weight egg yolk
    16 parts by weight flour (carbohydrate)
    1 part by weight moisture

Example 2

Total fat 73 parts:
    63 parts by weight shortening fat
    15 parts by weight egg yolk
    21 parts by weight flour (carbohydrate)
    1 part by weight moisture

Example 3

Total fat 73 parts:
    53 parts by weight shortening fat
    30 parts by weight egg yolk
    8 parts by weight flour (carbohydrate)
    8 parts by weight sugar
    1 part by weight moisture

Example 4

Total fat 73 parts:
    65 parts by weight shortening fat
    12.5 parts by weight egg yolk
    12.5 parts by weight milk solids (not fat)
    9 parts by weight sugar
    1 part by weight moisture

Example 5

Total fat 73 parts:
    60 parts by weight shortening fat
    20 parts by weight egg yolk
    19 parts by weight sugar
    1 part by weight moisture

Example 6

Total fat 73 parts:
    59.4 parts by weight shortening fat
    20 parts by weight egg yolk
    19.6 parts by weight soybean flour
    1 part by weight moisture

Example 7.—Method of preparation

The following method of preparation exemplifies one manner in which products according to this invention are made:

3,100 pounds of water are placed in a suitable vat and while agitating, sift 239 pounds (210 pounds solids) of wheat flour into the cool water. Also sift 158 pounds (150 pounds solids) of egg yolk into this mixture. Heat to about 150°–170° F. Hold for about 20 minutes. Homogenize at about 2,000 pounds pressure or higher, and spray dry.

The amount of egg yolk included should not be much below about 10 parts where the product includes a reduced amount of milk solids, and should not be substantially below 15 parts where milk solids are omitted. The upper limit of egg yolk introduced is usually not over about 30%.

The egg yolk forms a protective covering or hull about the fat core upon which it is adsorbed. The inherent presence of lecithin in the egg yolk appears to instantly rupture the hull and accelerate complete release of the fat upon mixture of the shortening with water in a baking mix.

The egg yolk may be obtained from various sources e. g. fresh egg yolk, frozen egg yolk, or powdered egg yolk; and in fact, in some cases whole egg products e. g. fresh eggs, frozen eggs, or powdered whole eggs may be incorporated.

The milk solids are any of the usual materials not fat employed in powdered shortenings such as skim milk solids, whey solids, soya bean solids, or buttermilk solids.

The edible shortening fat or oils may be liquid materials, semi-solid materials, or those which are solid at room temperature, either natural or chemically produced such as by hydrogenation. The oils may be cottonseed oil, corn oil, peanut oil, sunflower oil, or other edible oils, the semi-solid fats may be lard, butter, oleomargarine or the like, the solid fats may be animal fats or they may be the liquid oils previously mentioned which have been hydrogenated, or they may be hydrogenated soybean oil, hydrogenated fish oil, sperm oil or the like, or any combination of oils, semi-solid or solid fats. These comminuted shortenings contain upwardly of 50% of these fatty materials.

The examples above mentioned are purely illustrative and the proportions and ingredients may, of course, be varied as indicated according to the shortening composition desired.

As will be appreciated, the milk solids not fat may be entirely eliminated in favor of one or more of the carbohydrates or proteinous materials or mixtures thereof above described.

With reference to the carbohydrates employed, the sugar referred to may be cane, beet, or corn sugar; the flour may be wheat, rye, potato, oat, or "gelatinized" wheat flour (a flour which has been processed by treatment with water and heated to make it water absorptive, i. e., thicken when mixed with water and heated); the corn syrup solids may be liquid or dried; and the starches are corn starch, wheat starch, rye starch, cassava starch, barley starch, and potato starch. The proteins are soya bean flour or peanut flour.

In each of the examples, an algin containing material such as sodium alginate may be included in amounts of from about .1 to .6% based on the dry weight of the granular shortening. Usually about .2% to .4% is adequate. Other hydrophilic agents may be used instead of or admixed with the algin compound such as agar agar, gum tragacanth, gum acacia, gum arabic, and Irish moss.

While the examples show a total fat of 73 parts, this may be departed from and the fat may be present in amount of about 50 to 80 parts.

We claim:

A powdered shortening comprising a shortening fat core, a hull of milk solids not fat, and egg substance selected from the group consisting of whole egg and egg yolk, the fat present including shortening fat and egg fat being between 50 and 80 parts, and the amount of egg yolk present in the egg substance being between 10 and 30 parts.

GERALD C. NORTH.
ALVIN J. ALTON.
WILLIAM C. BROWN.

REFERENCES CITED

The following references are of record in the file of this patent:

UNITED STATES PATENTS

| Number | Name | Date |
|---|---|---|
| 2,035,899 | Kraft | Mar. 31, 1936 |
| 2,052,028 | Harris et al. | Aug. 25, 1936 |
| 2,065,676 | Fechner | Dec. 29, 1936 |
| 2,125,849 | Morris | Aug. 2, 1938 |